United States Patent
Groth et al.

(10) Patent No.: US 10,002,420 B2
(45) Date of Patent: Jun. 19, 2018

(54) MODEL-BASED SEGMENTATION OF AN ANATOMICAL STRUCTURE

(71) Applicant: KONINKLIJKE PHILIPS N.V., Eindhoven (NL)

(72) Inventors: Alexandra Groth, Hamburg (DE); Jochen Peters, Norderstedt (DE); Juergen Weese, Norderstedt (DE); Axel Saalbach, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 30 days.

(21) Appl. No.: 15/038,834

(22) PCT Filed: Nov. 26, 2014

(86) PCT No.: PCT/EP2014/075626
§ 371 (c)(1),
(2) Date: May 24, 2016

(87) PCT Pub. No.: WO2015/082269
PCT Pub. Date: Jun. 11, 2015

(65) Prior Publication Data
US 2017/0213338 A1 Jul. 27, 2017

(30) Foreign Application Priority Data

Dec. 4, 2013 (EP) .................................... 13195661

(51) Int. Cl.
*G06K 9/00* (2006.01)
*G06T 7/00* (2017.01)
*G06T 7/12* (2017.01)

(52) U.S. Cl.
CPC .............. *G06T 7/0012* (2013.01); *G06T 7/12* (2017.01); *G06T 2207/30048* (2013.01)

(58) Field of Classification Search
None
See application file for complete search history.

(56) References Cited

U.S. PATENT DOCUMENTS

| 8,275,446 B2 | 9/2012 | Vining et al. |
| 2008/0205716 A1 | 8/2008 | Von Berg et al. |

(Continued)

FOREIGN PATENT DOCUMENTS

| WO | 2004036500 A2 | 4/2004 |
| WO | 2006085248 A1 | 8/2006 |

OTHER PUBLICATIONS

Ecabert, O. et al., "Automatic Model-based Segmentation of the Heart in CT Images" IEEE Transactions on Medical Imagining 2008, 27(9), pp. 1189-1201.

(Continued)

*Primary Examiner* — Atiba O Fitzpatrick

(57) ABSTRACT

A system (100) is provided for performing a model-based segmentation of an anatomical structure in a medical image. The system comprises a processor (140) configured for performing a model-based segmentation of the anatomical structure by applying a deformable model to image data (042). Moreover, definition data (220) is provided which defines a geometric relation between a first part and a second part of the deformable model of which a corresponding first part of the anatomical structure is presumed to be better visible in the image data than a corresponding second part of the anatomical structure. The definition data is then used to adjust a fit of the second part of the deformable model. As a result, a better fit of the second part of the deformable model to the second part of the anatomical structure is obtained despite said part being relatively poorly visible in the image data.

20 Claims, 6 Drawing Sheets

(56) References Cited

U.S. PATENT DOCUMENTS

2008/0317308 A1* 12/2008 Wu .................... G06K 9/4638
 382/128
2013/0129170 A1  5/2013 Zheng et al.

OTHER PUBLICATIONS

Zhu, Y, "LV Segmentation and Motion Analysis from 4D Cardiac Images", Jun. 1, 2010, http://gradworks.umi.com/34/14/3414976.
Peters, J. et al, "Accurate Segmentation of the Left Ventricle in Computed Tomography Images for Local Wall Thickness Assessment", 2010, Medical Image Computing and Computer-Asisted Intervention a Miccai 2010, Berlin, pp. 400-408, last paragraph.
Meyer C. et al., "A multi-modality segmentation framework: Application to fully automatic heart segmentation", SPIE, Bellingham, WA, vol. 7259, 2009, pp. 1-12, p. 7, line 12-24.
Liu, H. et al., "Automatic Left Ventricle Segmentation in Cardiac MRI Using Topological Stable-State Thresholding and Region Restricted Dynamic Programming", Academic Radiology, Reston, VA, vol. 19, No. 6, 2012, pp. 723-731.
Groth, A. et al., "Robust left ventricular myocardium segmentation for multi-protocol MR", Proceedings of SPIE, vol. 8314, 2012, pp. 1-9, p. 3, line 6-10.
Heimann, T. et al., "Statistical shape models for 3D medical image segmentation: A review", Medical Image Analysis, GB, vol. 13, No. 4, 2009, pp. 543-563.
Ottenberg, K., Model-based extraction of geometric structure from digital images, dissertation, Universiteit Utrecht, Nov. 1993.
Erdt, M., et al., "Computer aided segmentation of kidneys using locally shape constrained deformable models on CT images", Medical Imagining 2010, Computer-Aided Diagnosis, Proc. of SPIE vol. 7624, pp. 762419-1-8.
Kaus, M.R., et al., "Automated segmentation of the left ventricle in cardiac MRI", Medical Image Analysis 8 (2004) 245-254.

* cited by examiner

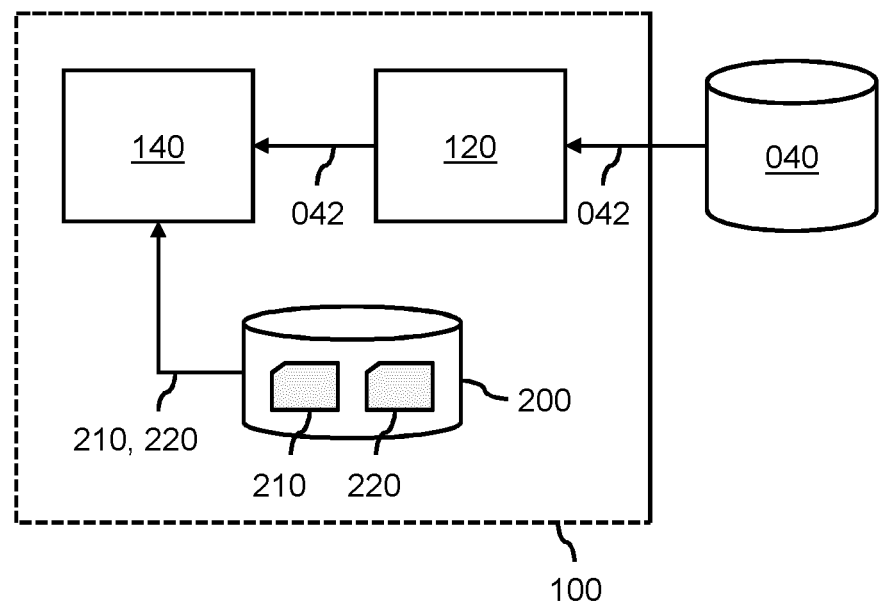
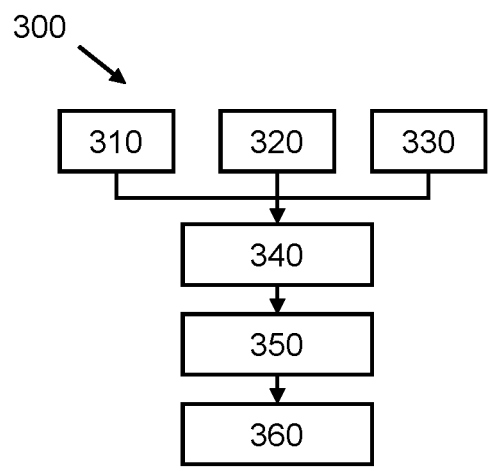
Fig. 2
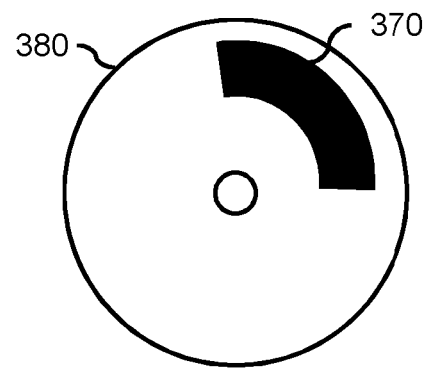
Fig. 3

US 10,002,420 B2

MODEL-BASED SEGMENTATION OF AN ANATOMICAL STRUCTURE

CROSS-REFERENCE TO PRIOR APPLICATIONS

This application is the U.S. National Phase application under 35 U.S.C. § 371 of International Application No. PCT/EP2014/075626, filed on Nov. 26, 2014, which claims the benefit of European Patent Application No. 13195661.7, filed on Dec. 4, 2013. These applications are hereby incorporated by reference herein.

FIELD OF THE INVENTION

The invention relates to a system and a method for performing a model-based segmentation of an anatomical structure in a medical image. The invention further relates to a data storage comprising model data defining a deformable model, to a workstation and imaging apparatus comprising the system and to a computer program product comprising instructions for causing a processor system to perform the method.

BACKGROUND OF THE INVENTION

Robust automatic segmentation of various anatomical structures in a medical image is a key enabler in improving clinical workflows. Here, the term segmentation refers to the identification of the anatomical structure in the medical image by, e.g., delineation of the boundaries of the anatomical structure, or by labeling of the voxels enclosed by the boundaries. Once such segmentation has been performed, it is possible to extract clinical parameters such as, in case of a cardiac structure, ventricular mass, ejection fraction and wall thickness. Consequently, automatic segmentation can significantly reduce the scan-to-diagnosis time, and thus help clinicians in establishing more efficient patient management.

It is known to segment an anatomical structure in a medical image using a deformable model. Such type of segmentation is also referred to as model-based segmentation. The deformable model may be defined by model data. In particular, the model data may define a geometry of the anatomical structure, e.g., in the form of a multi-compartmental mesh of triangles. Inter-patient and inter-phase shape variability may be efficiently modeled by assigning an affine transformation to each part of such a deformable model. Affine transformations cover translation, rotation, scaling along different coordinate axes and shearing. Moreover, mesh regularity may be maintained by interpolation of the affine transformations at the transitions between different parts of the deformable model.

The applying of a deformable model to the image data of the medical image, also referred to as mesh adaptation, may involve optimizing an energy function which may be based on an external energy term which helps to adapt the deformable model to the image data and an internal energy term which maintains a rigidness of the deformable model.

Deformable models of the above described type are known per se, as are methods of applying such models to an anatomical structure in a medical image.

For example, a publication titled "*Automatic Model-based Segmentation of the Heart in CT Images*" by O. Ecabert et al., IEEE Transactions on Medical Imaging 2008, 27(9), pp. 1189-1201, describes a model-based approach for the automatic segmentation of the heart (four chambers, myocardium, and great vessels) from three-dimensional (3D) Computed Tomography (CT) images. Here, model adaptation is performed progressively increasing the degrees-of-freedom of the allowed deformations to improve convergence as well as segmentation accuracy. The heart is first localized in the image using a 3D implementation of the generalized Hough transform. Pose misalignment is corrected by matching the model to the image making use of a global similarity transformation. The complex initialization of the multi-compartment mesh is then addressed by assigning an affine transformation to each anatomical region of the model. Finally, a deformable adaptation is performed to accurately match the boundaries of the patient's anatomy.

SUMMARY OF THE INVENTION

A problem of the known deformable models and ways of applying such models to an anatomical structure in a medical image is that they may inadequately fit parts of the anatomical structure which are poorly visible in the medical image.

It would be advantageous to have a system or method for enabling a deformable model to better fit the anatomical structure in such poorly visible parts.

To better address this concern, the following aspects of the invention provide definition data which defines a geometric relation between a first part and a second part of the deformable model of which a first part of the anatomical structure, to which the first part of the deformable model is to be fitted, is presumed to be better visible in the image data than a second part of the anatomical structure to which the second part of the deformable model is to be fitted. The definition data is then used to adjust a fit of the second part of the deformable model so as to better fit the second part of the anatomical structure.

A first aspect of the invention provides a system for performing a model-based segmentation of an anatomical structure in a medical image, the system comprising:
  an input for obtaining image data of the medical image;
  a data storage comprising model data defining a deformable model for segmenting a type of anatomical structure, the deformable model comprising parts to be fitted to corresponding parts of the anatomical structure; and
  a processor configured for performing a model-based segmentation of the anatomical structure by applying the deformable model to the image data;
  wherein the data storage further comprises definition data defining a geometric relation between a first part and a second part of the deformable model of which a corresponding first part of the anatomical structure is presumed to be better visible in the image data than a corresponding second part of the anatomical structure;
  wherein the processor is further configured for, after said applying of the deformable model to the image data:
  i) using the definition data to locate an image feature in the image data which matches the geometric relation with the first part of the deformable model; and
  ii) adjusting a fit of the second part of the deformable model based on a location of the image feature so as to better fit the second part of the deformable model to the second part of the anatomical structure.

A further aspect of the invention provides a data storage comprising:
  model data defining a deformable model for segmenting a type of anatomical structure, the deformable model comprising parts to be fitted to corresponding parts of the anatomical structure; and definition data defining a geometric relation between a first part and a second part of the deformable model of which a corresponding first part of the anatomical structure is presumed to be better visible in the image data than a corresponding second part of the anatomical structure.

A further aspect of the invention provides a method for performing a model-based segmentation of an anatomical structure in a medical image, the method comprising:

obtaining image data of the medical image;

providing model data defining a deformable model for segmenting a type of anatomical structure, the deformable model comprising parts to be fitted to corresponding parts of the anatomical structure;

providing definition data defining a geometric relation between a first part and a second part of the deformable model of which a corresponding first part of the anatomical structure is presumed to be better visible in the image data than a corresponding second part of the anatomical structure;

performing a model-based segmentation of the anatomical structure by applying the deformable model to the image data;

using the definition data to locate an image feature in the image data which matches the geometric relation with the first part of the deformable model; and adjusting a fit of the second part of the deformable model based on a location of the image feature so as to better fit the second part of the deformable model to the second part of the anatomical structure.

A further aspect of the invention provides a computer program product comprising instructions for causing a processor system to perform the method.

The above measures involve obtaining image data of the medical image. The medical image shows an anatomical structure such as an organ, a part of the organ, etc. Such medical images are typically of a patient and may be obtained using an imaging modality such as, e.g., CT, Magnetic Resonance (MR) imaging, etc. Furthermore, model data is provided which defines a deformable model for segmenting a type of anatomical structure. For example, the deformable model may be arranged for segmenting the human heart or a part thereof. The model data may be comprised on a data storage such as semiconductor memory, a magnetic or optical disk, etc. The deformable model comprises parts to be fitted to corresponding parts of the anatomical structure. For example, a part of the deformable model may be arranged for fitting a left ventricle of the heart whereas another part of the deformable model may be arranged for fitting a right ventricle of the heart. It is noted that the deformable model may not need to be explicitly partitioned into such parts. Rather, such parts may be implicitly yet inherently present. Furthermore, a processor is provided for performing a model-based segmentation of the anatomical structure, namely by applying the deformable model to the image data. It is noted that the functionality described in this paragraph is known per se from the field of model-based segmentation of anatomical structures.

Additionally, definition data is provided for defining a geometric relation between a first part and a second part of the deformable model. Here, the first part and the second part of the deformable model are specifically those parts, i.e., have been specifically selected, of which a corresponding first part of the anatomical structure is presumed to be better visible in the image data than a corresponding second part of the anatomical structure. It is noted that said difference in visibility may be caused by a difference in anatomical characteristics between the different parts of the anatomical structure which yields a difference in visibility after being imaged. For example, the different anatomical structures may have a different density causing a different absorption of the x-ray beam. Also the anatomical structures may vary in thickness. Additionally contrast agents may improve the visibility of anatomical structures due to the introduction of additional electrons to interact. It is further noted that the difference in visibility may be presumed in that previous experience, textbook knowledge or similar information may already predict such difference in visibility. In particular, such differences may be presumed based on the anatomical characteristics in combination with the characteristics of the imaging modality. As such, it may not be needed to actually analyze the particular image data to determine said difference.

The geometric relation may indicate a presumed relative position between the first part and the second part of the deformable model if said deformable model has been correctly applied to the image data, i.e., even to parts of the anatomical structure which are poorly visible in the image data. It is noted that due to inter-patient and inter-phase shape variability, the geometric relation may involve a probability. This may be taken into account by the geometric relation indicating, e.g., a range of probable relative positions.

Moreover, the processor is configured for, after the deformable model has been initially applied to the image data, using the definition data to locate an image feature in the image data which matches the geometric relation with the first part of the deformable model. As such, the image feature is located by taking into account the geometric relation between the first part and the second part of the deformable model as well as the location of the first part of the deformable model in the image data. Effectively, the processor may locate the image feature there where the second part of the anatomical structure is expected to be located based on said geometric relation and the location of the first part of the deformable model in the image data. For example, if the geometric relation indicates that the second part of the deformable model is positioned orthogonally with respect the first part of the deformable model, namely at a distance between 1 mm and 2 mm if said second part has been correctly applied to the image data, the image feature may be located by searching in the image data orthogonally to the first part of the deformable model with said range.

In addition, the processor is configured for using the location of the image feature to better fit the second part of the deformable model to the second part of the anatomical structure. This may effectively comprise a re-applying of the deformable model to the image data while taking into account the location of the image feature. Another possibility is that only the second part of the deformable model is selectively adjusted.

The above measures have the effect that definition data is provided which indicates to the processor where the second part of the deformable model is expected to be positioned if the deformable model had been correctly applied to the image data. As this is typically not the case, i.e., due to the presumed relatively poor visibility of the corresponding second part of the anatomical structure in the image data, the processor is enabled to locate an image feature which matches the geometric relation with the first part of the deformable model, and thereby is likely a part of, or entirely constitutes, an image representation of the second part of the anatomical structure. By adjusting the fit of the second part of the deformable model based on the location of the image feature, a better fit of the second part of the deformable model can be obtained despite said relatively poor visibility of the second part of the anatomical structure. Effectively, the above measures enable the system to specifically improve those parts of the deformable model which are expected to yield an inadequate fit despite the deformable model having already been optimized for fitting such parts, e.g., by selecting different affine transformations or different energy terms for these parts.

The inventors have recognized that the above measures may be advantageously applied to improve the fit of a deformable model to the epicardial border of the left atrium. This border is typically poorly visible in cardiac CT images, making correct automatic but also manual segmentation difficult. By providing the geometric relation between a part of the deformable model which models the endocardial border, and which is typically well visible in cardiac CT images, and the part of the deformable model which models the epicardial border, the system is enabled to specifically search for image features of the epicardial border, which may be different or more specific than, e.g., the image gradients frequently used in applying the deformable model to the image data. For example, the system may locate a second downwardly sloping edge following a first downwardly sloping edge and an intermediate plateau between both edges, thereby enabling the system to locate the epicardial border in the image data and to subsequently better fit the deformable model to the epicardial border. The inventors have further recognized that such differences in visibility may exist in various other types of anatomical structures. Therefore, although the model-based segmentation of the endocardial and epicardial borders of the left atrium will be frequently used as an example, the invention is not limited to this particular anatomical structure and may be advantageously applied to other anatomical structures as well.

Optionally, the processor is configured for locating the image feature by searching for the image feature in an intensity profile of the image data using the geometric relation as search parameter. An intensity profile sets out intensity values as a function of position in a specific direction. It has been found that an intensity profile is well suited for locating an image feature that is related to a part of the anatomical structure which is presumed to be poorly visible. Since such parts of the anatomical structure are typically related to (a part of) a border, the shape of the intensity profile typically enables the border to be located, even if the border itself is not visible. For example, if several borders overlap, this may establish a particular shape in the image profile. By using the geometric relation as search parameter, the search can be constrained, e.g., to a specific region or area.

Optionally, the processor is configured for establishing the intensity profile orthogonally to the first part of the deformable model. Orthogonal intensity profiles are well suited for locating an image feature that is related to an inner part of the anatomical structure with respect to an outer part of the anatomical structure, i.e., an inner surface and an outer surface. If the anatomical structure is relatively thin, the borders of the inner surface and outer surface may partially overlap in the image data, thereby making a fit to a less visible one of both borders difficult. The orthogonal intensity profile enables such a border to be located if, e.g., a distance or a range of distances is indicated from the more visible border.

Optionally, the processor is arranged for locating the image feature by applying a template matching to the intensity profile. A template matching is well suited for locating various types of image features, such as a part of an edge, a plateau, etc.

Optionally, the image feature is one of the group of: an edge, a plateau in the edge, a local maximum and a local minimum. These image features have been found to be well suited in locating parts of an anatomical structure which are relatively poorly visible.

Optionally, the processor is further configured for performing an image enhancement prior to locating the image feature in the image data. By performing an image enhancement, the visibility of otherwise poorly visible parts of the anatomical structure may be enhanced. For example, the image enhancement may be adapted to the type of image feature, the geometric relation to the first part of the deformable model, etc.

Optionally, the processor is configured for performing a directional filtering as part of the image enhancement, the directional filtering having a filter orientation parallel to the first part of the deformable model. Directional filtering parallel to the first part of the deformable model is well suited for enhancing the visibility of a surface which is relatively poorly visible compared to a nearby surface, since noise or image features of other parts of the anatomical structure may be suppressed, thereby enhancing the visibility of said surface.

Optionally, the direction filtering comprises an intensity averaging in a neighborhood having a length parallel to the first part of the deformable model.

Optionally, the geometric relation is defined by at least one of the group of: a distance, a range of distances, a direction, and a range of directions, from the first part of the deformable model to the second part of the deformable model. The distance and/or direction may indicate a relative position of the second part of the deformable model with respect to the first part. A range of distances and/or directions allows taking into account inter-patient and inter-phase shape variability. It will be appreciated that by defining a range of distances and a range of directions, a two-dimensional or three-dimensional area may be defined.

Optionally, the processor is further configured for:
i) determining a probability of whether the image feature which has been located actually corresponds to the second part of the anatomical structure; and
ii) adjusting the fit of the second part of the deformable model based on the probability.

By determining a probability of whether the image feature which has been located actually corresponds to the second part of the anatomical structure, the processor effectively determines a reliability measure and thus takes into account that the image feature may not be correctly located despite the taken measures. By adjusting the fit of the second part of the deformable model based on the probability, the degree of adjusting may be made dependent on the probability that the correct image feature has been found. Effectively, the degree of adjustment may be modulated based on said probability, yielding a small or no adjustment in case of a low probability and a full adjustment in case of a high probability.

Optionally, the definition data is further indicative of a property of the image feature, and wherein the processor is configured for locating the image feature in the image data further based on the property. The definition data therefore not only indicates a likely location of the image feature, but also a property of the image feature, e.g., a type, a size, etc. For example, the definition data may indicate that the image feature to be located is a plateau in an edge which is presumed to be located 2 mm from the first part of the deformable model.

Optionally, the deformable model is arranged for segmenting at least a part of a human heart, wherein the first part of the deformable model is arranged for fitting an endocardial surface of the human heart and the second part of the deformable model is arranged for fitting an epicardial surface of the human heart.

A further aspect of the invention provides a workstation or imaging apparatus comprising the system.

It will be appreciated by those skilled in the art that two or more of the above-mentioned embodiments, implementations, and/or aspects of the invention may be combined in any way deemed useful.

Modifications and variations of the imaging apparatus, the workstation, the method, and/or the computer program product, which correspond to the described modifications and variations of the system, can be carried out by a person skilled in the art on the basis of the present description.

A person skilled in the art will appreciate that the method may be applied to multi-dimensional image data, e.g. to two-dimensional (2D), three-dimensional (3D) or four-dimensional (4D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

The invention is defined in the independent claims. Advantageous embodiments are defined in the dependent claims.

BRIEF DESCRIPTION OF THE DRAWINGS

These and other aspects of the invention are apparent from and will be elucidated with reference to the embodiments described hereinafter. In the drawings, FIG. 1 shows a system for performing a model-based segmentation of an anatomical structure in a medical image;

FIG. 2 shows a method for performing the model-based segmentation;

FIG. 3 shows a computer program product for carrying out the method;

DETAILED DESCRIPTION OF EMBODIMENTS

Figure 4:
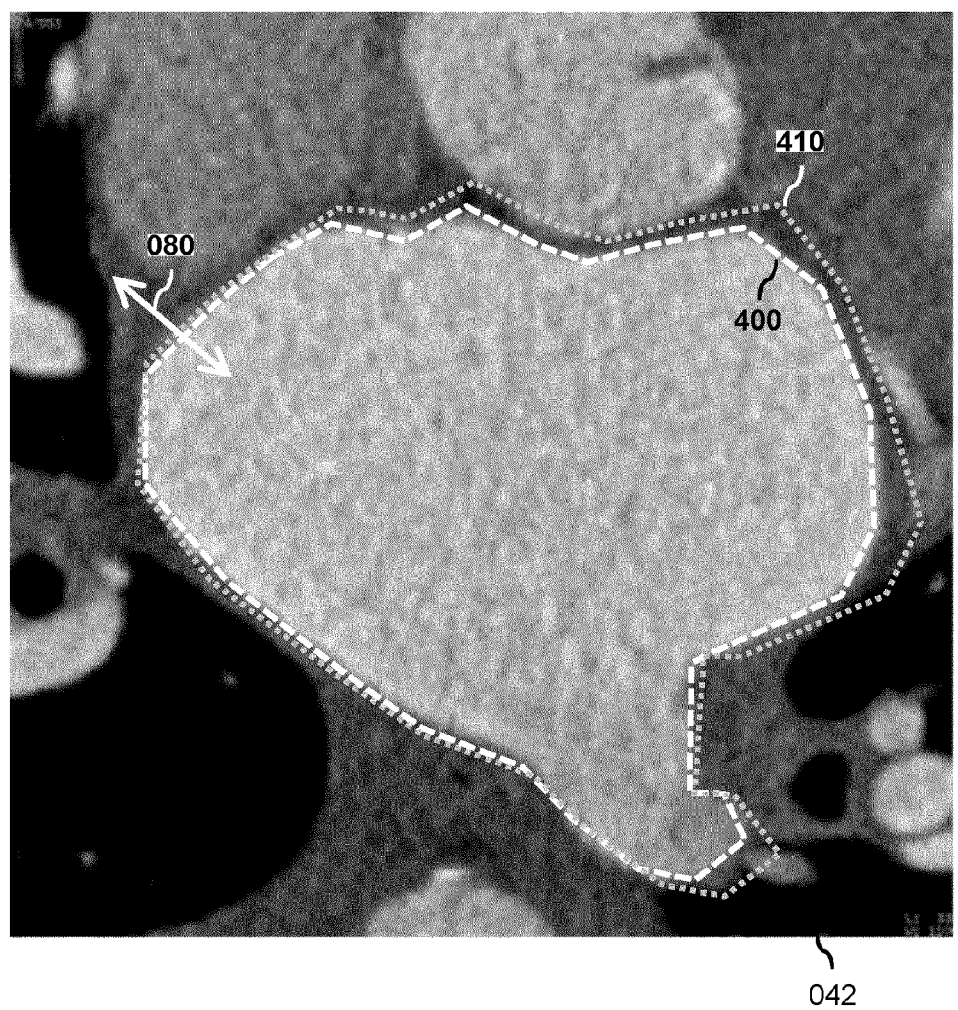
FIG. 4 shows an example of a deformable model having been applied to a CT image of a left atrium of the human heart, in which an inner part of the deformable model is shown to adequately fit an endocardial surface of the left atrium and an outer part of the deformable model is shown to inadequately fit an epicardial surface of the left atrium.

FIG. 1 shows a system 100 for performing a model-based segmentation of an anatomical structure in a medical image. The system 100 comprises an input 120 for obtaining image data 042 of the medical image. For that purpose, the system 100 is shown to be connected to a database 040. For example, the database 040 may be constituted or part of a Picture Archiving and Communication System (PACS) of a Hospital Information System (HIS) to which the system 100 may be connected or comprised in. The system 100 further comprises a data storage 200 which comprises model data 210 defining a deformable model for segmenting a type of anatomical structure, with the deformable model comprising parts to be fitted to corresponding parts of the anatomical structure. The data storage 200 is shown to be an internal component of the system 100, and may be constituted by, e.g., a disk-based data storage such as a hard disk, a semiconductor-based data storage such as a ROM or RAM memory, a removable storage medium inserted into a storage medium reader, etc. It is noted that the data storage 200 may also be separately provided, e.g., in the form the removable storage medium. The system 100 further comprises a processor 140 which is configured for performing a model-based segmentation of the anatomical structure by applying the deformable model to the image data. For that purpose, the processor 140 is shown to receive the model data defining the deformable model from the data storage 200, and the image data 042 of the medical image from the database 040 via the input 120.

The data storage 200 further comprises definition data 220 defining a geometric relation between a first part and a second part of the deformable model of which a corresponding first part of the anatomical structure is presumed to be better visible in the image data 042 than a corresponding second part of the anatomical structure. Accordingly, the definition data 220 may be separately provided from the model data 210. Alternatively, the definition data 220 may be included in the model data 210, e.g., in the form of metadata. It is noted that in general, the definition data 220 may be provided for a only subset of the parts of the deformable mode. For example, only for those parts which are presumed to be poorly visible in the image data 042 and thus are presumed to result in an inadequate fit to the corresponding part of the anatomical structure, a geometric relation may be defined to a respective part of the deformable model which is presumed to obtain a better fit.

The processor 140 is further configured to perform the following operations. After having applied the deformable model to the image data, the processor 140 uses the definition data to locate an image feature in the image data 042 which matches the geometric relation with the first part of the deformable model. The processor then adjusts a fit of the second part of the deformable model based on a location of the image feature so as to better fit the second part of the deformable model to the second part of the anatomical structure. Accordingly, an adjusted second part of the deformable model is obtained.

It is noted that the operation of the system 100, and in particular the operation of the processor 140, will be explained in more detail with reference to FIGS. 4-9B.

FIG. 2 shows a method 300 for performing a model-based segmentation of an anatomical structure in a medical image. The method 300 comprises, in a stage titled "OBTAINING IMAGE DATA", obtaining 310 image data of the medical image. The method 300 further comprises, in a stage titled "PROVIDING MODEL DATA", providing 320 model data defining a deformable model for segmenting a type of anatomical structure, the deformable model comprising parts to be fitted to corresponding parts of the anatomical structure. The method 300 further comprises, in a stage titled "PROVIDING DEFINITION DATA", providing 330 definition data defining a geometric relation between a first part and a second part of the deformable model of which a corresponding first part of the anatomical structure is presumed to be better visible in the image data than a corresponding second part of the anatomical structure. It will be appreciated that the above stages may be performed in any suitable order, e.g., consecutively, simultaneously, or a combination thereof.

The method 300 further comprises, in a stage titled "PERFORMING MODEL-BASED SEGMENTATION", performing 340 a model-based segmentation of the anatomical structure by applying the deformable model to the image data. The method 300 further comprises, in a stage titled "LOCATING IMAGE FEATURE WHICH MATCHES GEOMETRIC RELATION WITH FIRST PART OF DEFORMABLE MODEL", using 350 the definition data to locate an image feature in the image data which matches the geometric relation with the first part of the deformable model. The method 300 further comprises, in a stage titled "ADJUSTING FIT OF SECOND PART OF DEFORMABLE MODEL BASED ON LOCATION OF IMAGE FEATURE", adjusting 360 a fit of the second part of the deformable model based on a location of the image feature so as to better fit the second part of the deformable model to the second part of the anatomical structure.

FIG. 3 shows a computer program product 380 comprising instructions 370, i.e., a computer program, for causing a processor system to perform the method of FIG. 2. The computer program 370 may be comprised in a non-transitory manner on a computer readable medium 380, e.g., in the form of as a series of machine readable physical marks and/or as a series of elements having different electrical, e.g., magnetic, or optical properties or values.

The operation of the system of FIG. 1 and the method of FIG. 2, including various optional aspects thereof, may be explained in more detail as follows.

FIG. 4 shows image data 042 corresponding to a slice through a volumetric CT image of a patient. The image data 042 shows a left atrium of the patient. FIG. 4 illustrates a result which may be obtained when applying a known deformable model of the left atrium to the image data 042, namely that a first (inner) part of the deformable model 400 which is arranged for fitting the endocardial surface of the left atrium adequately fits said surface, whereas a second (outer) part of the deformable model 410 arranged for fitting the epicardial surface of the left atrium inadequately fits said surface. The latter aspect can be seen by the outer part of the deformable model 410 at times erroneously fitting to the endocardial surface and at times erroneously fitting to portions of other neighboring structures. A typical reason for this is that the epicardial surface may be poorly visible in such volumetric CT images, especially when compared to the endocardial surface or the surface of such other neighboring structures. As such, the known deformable models and the ways of applying such models may obtain an inadequate fit of the deformable model to such an epicardial surface.

In this respect, it is noted that FIG. 4 shows a slice through a volumetric CT image of a patient and consequently also a slice through the deformable model. It will be appreciated that for such volumetric image data, such a deformable model is typically a 3D model, e.g., by being constituted by a multi-compartmental mesh of triangles. It is noted that such deformable models are known per se from the field of model-based segmentation.

In accordance with the example of FIG. 4, the definition data may define a geometric relation between the inner part and the outer part of the deformable model in the presumption that the inner part is likely to fit the endocardial border shown in the image data 042 relatively well, whereas the outer part is likely to fit the epicardial border less well, i.e., relatively poorly. For example, the geometric relation may be a distance or a range of distances which makes use of the fact that the distance between the endocardial surface and the epicardial surface is usually 1.89 mm+/−0.48 mm due to the typical thickness of the myocardial wall between the endocardial surface and the epicardial surface. It is noted that different geometric relations may be provided for different parts of the deformable model. For example, in certain regions of the left atrium, the myocardial wall may be up to 3.5 mm thick. Accordingly, for the part(s) of the deformable model which are arranged to fit the epicardial border in these regions, a distance or range of distances based on said 3.5 mm may be provided with respect to the part(s) of the deformable model fitting the endocardial border.

FIG. 4 further illustrates an optional aspect of the invention, in that the processor may be arranged for locating the image feature in the image data 042 which matches the geometric relation with the first part of the deformable model 400 by searching for the image feature in an intensity profile of the image data 042 which is established orthogonally 080 to the first part of the deformable model 400. Accordingly, the geometric relation may be defined as a distance, or a range of distances, orthogonally to the first part of the deformable model 400, e.g., by additionally defining said an orthogonal direction or this being implicitly assumed. It is noted the orthogonality of the geometric relation applies in particular to deformable models which comprise inner parts and outer parts and to anatomical structures which comprise such inner parts and outer parts. It will be appreciated, however, that for other deformable models and/or anatomical structures, different types of geometric relations may be presumed and therefore defined by the definition data. For example, the distance or the range of distances may be defined at a non-orthogonal direction.

Figure 5A:
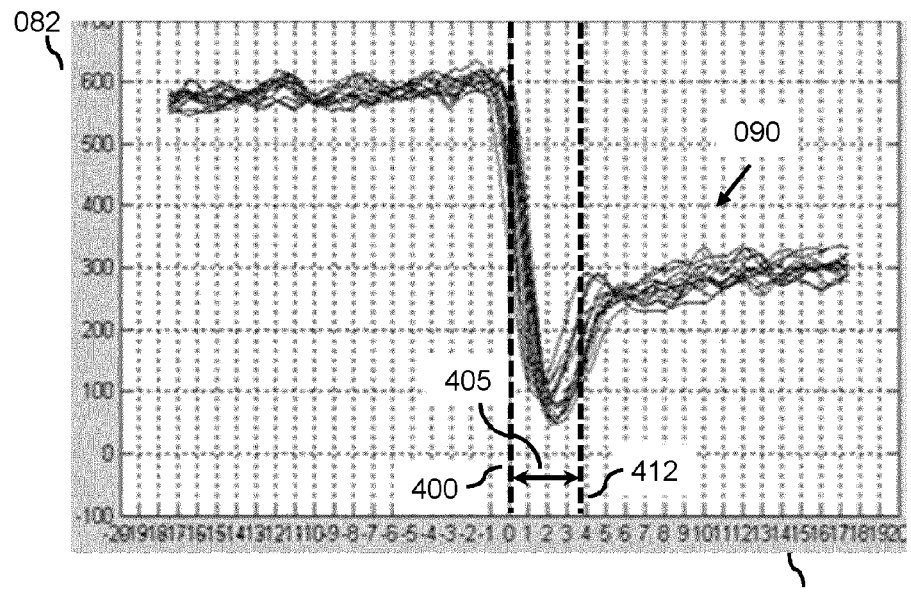
FIG. 5A shows intensity profiles orthogonal to the inner part of the deformable model in a region where the epicardial surface has no close neighboring structures, with the outer part of the deformable model having been adjusted to better fit the epicardial surface of the left atrium based on a distance to the applied inner part of the deformable model.

FIG. 5A shows several intensity profiles 090 orthogonal to the inner part of the deformable model in a region where the epicardial surface has no close neighboring structures. Here, the vertical axis 082 corresponds to image intensity, as expressed in Hounsfield Units (HU). The horizontal axis 080 corresponds to a distance along the intensity profile, with the distance being defined with respect to the inner part of the deformable model after having been applied to the image data. Accordingly, 0 mm corresponds to the inner part of the deformable model, which, when applied correctly, corresponds to the endocardial surface of the left atrium. FIG. 5A illustrates this location of the inner part of the deformable model 400 along the intensity profile by means of a dashed line. FIG. 5A further illustrates a geometric relation in the form of a relative distance 405, as well as the location of the outer part of the deformable model 412 after having been adjusted based on the geometric relation. It is noted that, for reasons of comprehensibility, FIG. 5A and further do not show the (erroneous) location of the outer part of the deformable model 412 prior to being adjusted.

It can be seen in FIG. 5A that in regions where the epicardial surface has no close neighboring structures, the border of endocardial surface, henceforth also referred to as endocardial border, is visible as a relatively prominent downwardly sloping edge, i.e., a descending ramp function, which is therefore relatively well visible in the intensity profile 090. The epicardial border is rather visible as a subsequent upwardly sloping edge of lesser prominence by representing a smaller change in intensity. It is noted that this change in intensity, i.e., the increase when considering the intensity profile from left to right, may be as low as 100 HU. It is further noted that the dent in-between both edges represents the atrial myocardium. In the example of FIG. 5A, the geometric relation may define a range of distances between 1.5 mm to 4 mm. This range of distances may represent a presumed location of the epicardial border in an orthogonal, outwards direction from the endocardial border. Therefore, having applied the inner part of the deformable model to the endocardial border, the processor may search for an image feature in the intensity profile 090 which matches the geometric relation, i.e., the processor may search for the image feature within 1.5 mm to 4 mm left from the location of the inner part of the deformable model in the intensity profile 090. The image feature may be an edge, in particular an upwardly sloping edge. However, as will be seen in subsequent examples, the image feature also take another form, e.g., a plateau in the edge, a local maximum, a local minimum, etc. The definition data may indicate the image feature or a property of the image feature. Alternatively, the image feature and/or its property may be otherwise specified to the processor or hardcoded.

Figure 5B:
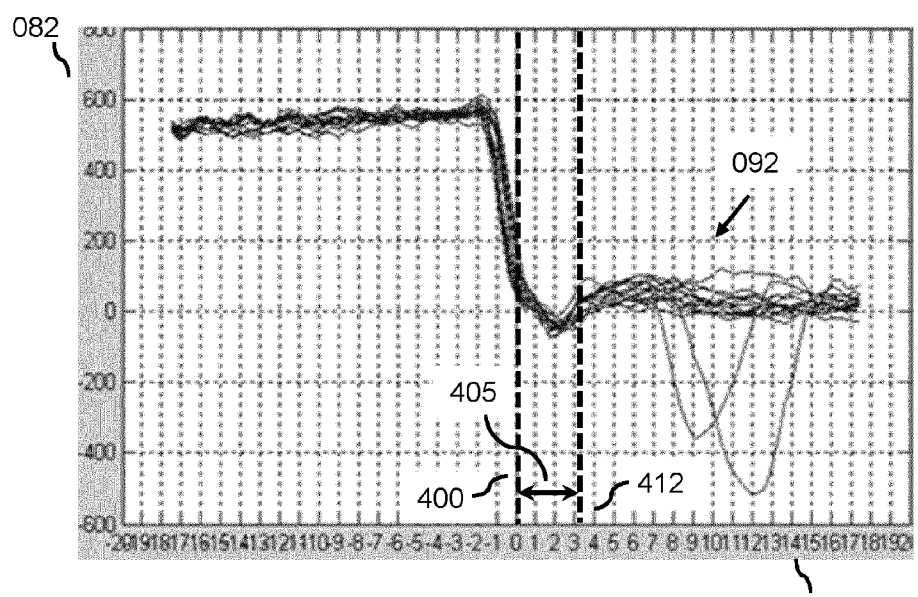
FIG. 5B shows such intensity profiles at a different region of the left atrium.

FIG. 5A shows the outer part of the deformable model 412 having been adjusted to correctly fit the epicardial border. FIG. 5B shows similar intensity profiles 092 as in FIG. 5A, with the exception that in the region which corresponds to FIG. 5B, the epicardial border is even less visible, i.e., by representing a smaller increase in intensity than the epicardial border shown in FIG. 5A. Consequently, the outer part of the deformable model may be fit incorrectly to the epicardial border. In contrast, the endocardial border is still relatively well visible, resulting in the inner part of the deformable model having been fit correctly to the epicardial border. As in the example of FIG. 5A, the definition data may indicate a range of distances for the processor to search for an upwardly sloping edge. For that purpose, edge detection techniques may be used as known per se from the field of image processing and analysis. Accordingly, the edge corresponding to the epicardial border may be detected and the outer part of the deformable model may be adjusted to fit the location of the edge, thereby obtaining an adjusted outer part of the deformable model 412.

Figure 6:
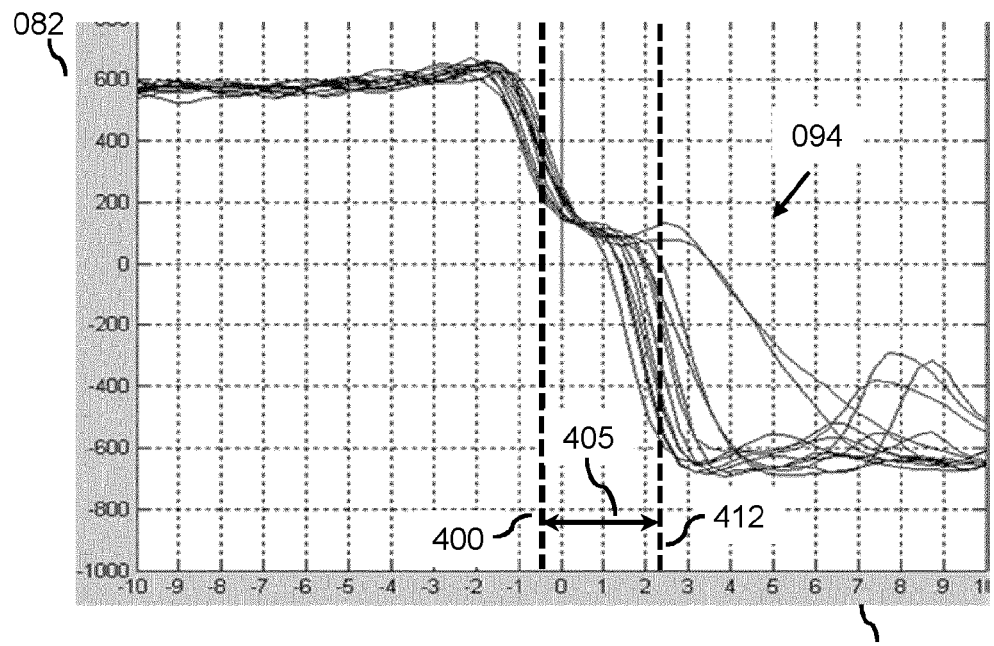
FIG. 6 shows intensity profiles orthogonal to the inner part of the deformable model in a region where the epicardial surface is surrounded by air, with the second part of the deformable model having again been adjusted to better fit the epicardial surface.

FIG. 6 shows intensity profiles 094 orthogonal to the first part of the deformable model in a region where the epicardial surface is surrounded by air, as may occur in some regions of the left atrium. In this case, the intensity profiles 094 may show a relatively prominent decrease in intensity of the endocardial border, a thin atrial myocardium in form of a plateau and then a further decrease in intensity caused by the transition to air. To detect the epicardial border, instead of searching for an upwardly sloping edge as in the case of FIGS. 5A and 5B, the image feature may correspond to this further decrease in intensity. An additional problem may be that the atrial myocardium may be so thin that no real plateau is visible, resulting potentially in one large downwardly sloping edge. Nevertheless, in most cases the combination of a suitably defined geometric relation, e.g., a suitable range of distances, in combination with a suitably defined image feature, e.g., a second downwardly sloping edge, may result in an improved fit of the deformable model to the epicardial border. In particular, a template matching may be used to detect the epicardial border, namely by the template matching providing a location on the one large downwardly sloping edge.

It will be appreciated that in order to cope with the different shapes of the epicardial border across the different intensity profiles, the definition data may define a different image feature or property for different parts of the deformable model.

Figure 7:
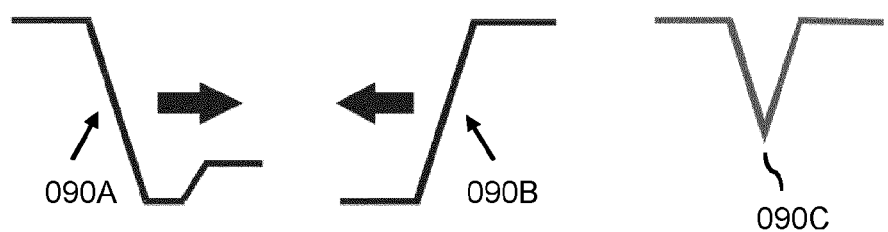
FIG. 7 illustrates one of the causes of the poor visibility of the epicardial surface of the left atrium, namely by the epicardial surface being located close to a strongly contrasting neighboring structure.
Figure 8A:
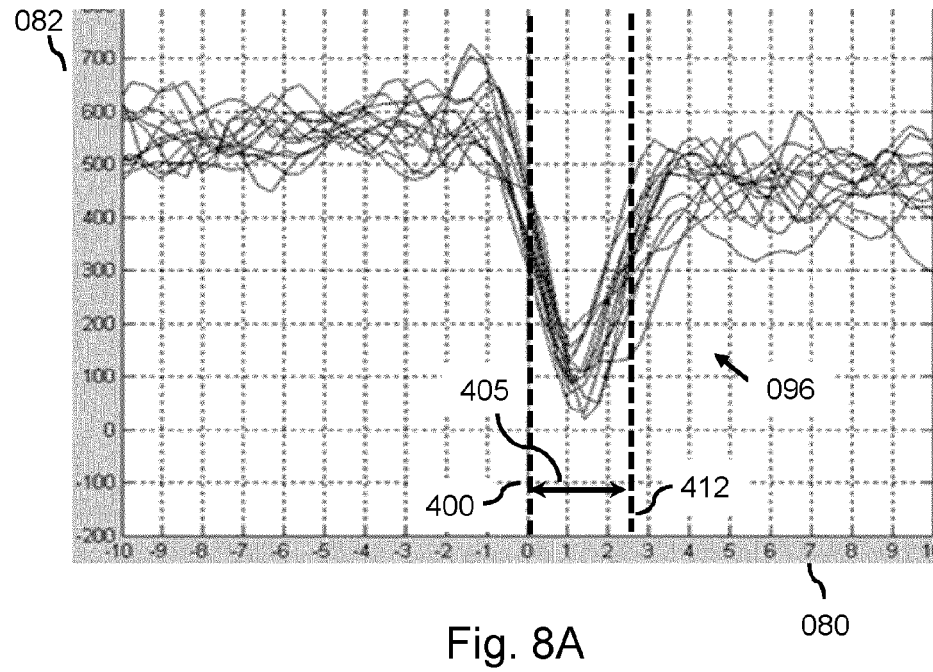
FIG. 8A shows intensity profiles orthogonal to the inner part of the deformable model in a region where the epicardial surface is close to such a strongly contrasting neighboring structure, with the outer part of the deformable model having again been adjusted to better fit the epicardial surface.
Figure 8B:
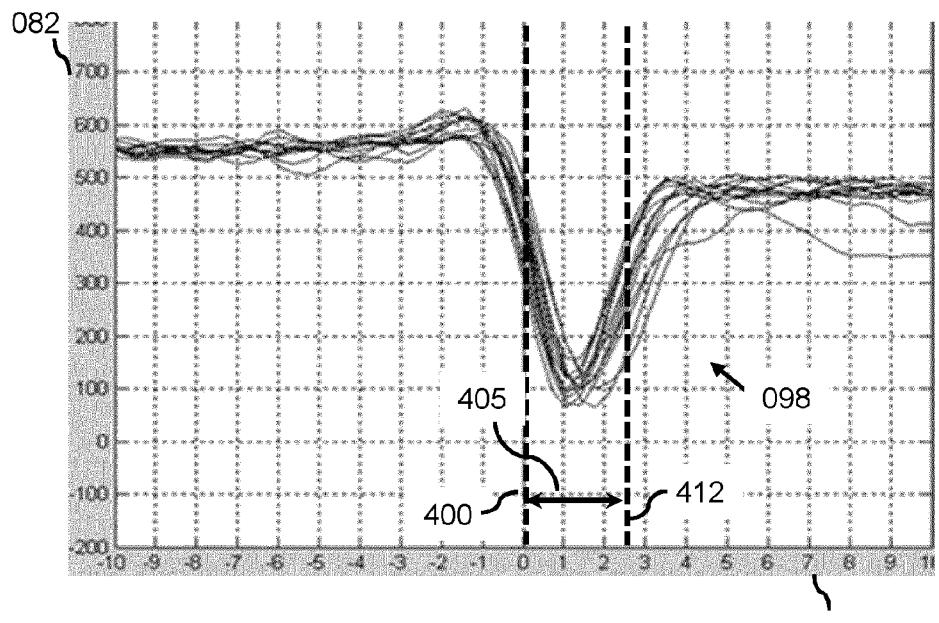
FIG. 8B shows the intensity profiles after image enhancement, namely an intensity averaging in a neighborhood parallel to the inner part of the deformable model.

FIG. 7 illustrates one of the causes of poor visibility of a part of an anatomical structure such as the epicardial surface, namely by said part being located close to a strongly contrasting neighboring structure. An example is the region of the left atrium which is adjacent to the aorta. Here, the intensity profiles may show a clearly upwardly sloping edge after the downwardly sloping edge of the endocardium, as also shown in FIGS. 8A and 8B. However, here, the clearly upwardly sloping edge is predominately caused by the border of the aorta rather than by the epicardial border. Since the border of the aorta and the epicardial border are located so closely together relative to the resolution of the imaging apparatus used to acquire the medical image, they may overlap each other in the image data. This is conceptually illustrated in FIG. 7, showing the overlapping of the intensity profile of the aorta 090B with that of the endocardial and epicardial borders 090A. In the resulting combined intensity profile 090C, the upwardly sloping edge of the epicardium is not visible anymore in that the intensity profile is visually dominated by the upwardly sloping edge of the aorta.

FIG. 8A shows the intensity profiles 096 in the region of the left atrium which is adjacent to the aorta. As can be seen here, the outer part of the deformable model may nevertheless be adjusted to fit the epicardial border. For that purpose, the geometric relation may be suitably defined, e.g., as the expected mean thickness of the myocardium. Also, the image feature may be suitably defined, e.g., as the middle of the upwardly sloping edge.

The processor may be further configured for performing an image enhancement prior to locating the image feature in the image data. The image enhancement may comprise a directional filtering having a filter orientation parallel to the first part of the deformable model. For example, an intensity averaging may be performed in a neighborhood having a length parallel to the first part of the deformable model. FIG. 8B shows a result of such smoothing applied to the intensity profiles 096 of FIG. 8A. It can be seen that the image enhancement increases the visibility and definition of both the downwardly sloping edge of the endocardial border as well as the upwardly sloping edge of the aorta combined with the epicardial border. It will be appreciated that such image enhancement allows the image feature to be more accurately located, as noise or other disturbances may be reduced.

Figure 9A:
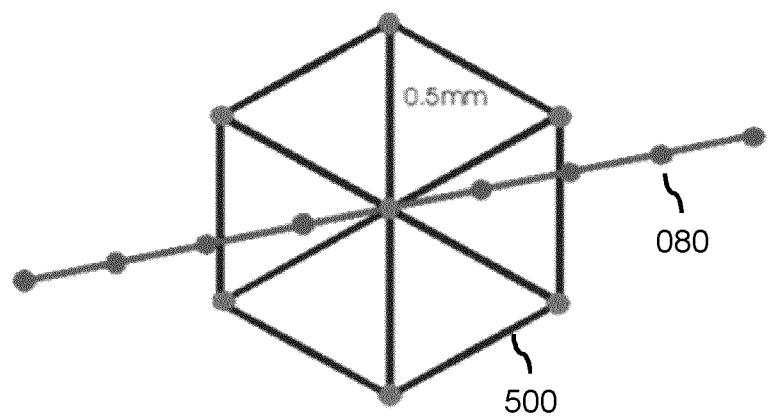
FIG. 9A shows a first filter kernel for the intensity averaging.
Figure 9B:
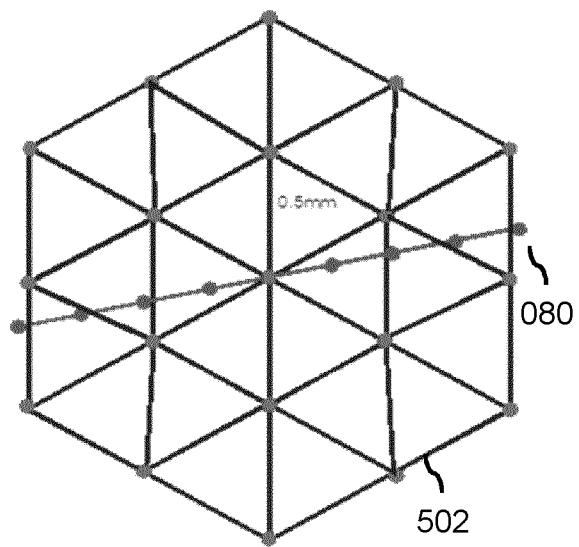
FIG. 9B shows a second filter for the intensity averaging.

FIG. 9A shows a possible filter kernel 500 which may be applied to the intensity values along the intensity profile 080. Here, the filter kernel is shown to be a hexagonal shape which includes the current intensity value as well as the six neighboring intensity values. In this example, this yields a filter radius of 0.5 mm when taking into account the resolution of the image data. FIG. 9B shows a larger hexagonal filter kernel which provides a stronger degree of filtering. It is noted that the filter kernel, and in particular its radius, may be user-selectable or directly specifiable by the user. Moreover, it will be appreciated that instead of intensity averaging, other types of filtering may be advantageously used as well. For example, a rank-order filter such as a median filter may be used.

In general, the processor may be further configured for determining a probability of whether the image feature which has been located actually corresponds to the second part of the anatomical structure, and for adjusting the fit of the second part of the deformable model based on the probability. For example, when applying an edge detection to the image data, a threshold may be applied to determine a probability whether or not a relevant edge has been located. In absence of such an edge, the adjusting of the fit of the second part of the deformable model may be carried out to a lesser degree or omitted.

It will be appreciated that the invention may be advantageously used to provide, as part or in addition to the deformable model, information on how to detect an anatomical structure which is poorly visible, such as the epicardial border. The information may indicate, e.g., an image feature and a geometric relation of the image feature to a part of the deformable model which is presumed to adequately fit the anatomical structure. The information may be provided separately, i.e., in the form of definition data which is separate from the model data. However, such definition data may also be encoded in the model data, e.g., by associating certain triangles of the segmentation mesh with such information. Having located the image feature, the location of the image feature may then be used as a target point so as to adjust the fit of the deformable model. The adjustment may be performed locally, i.e., only there were the deformable model inadequately fit the anatomical structure.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for performing a model-based segmentation of an anatomical structure in a medical image, the system comprising:
    an input that obtains image data of the medical image;
    a data storage comprising model data defining a deformable model for segmenting a type of anatomical structure, the deformable model comprising parts to be fitted to corresponding parts of the anatomical structure, wherein the data storage further comprises definition data defining a geometric relation between a first part and a second part of the deformable model; and
    a processor that:
        performs a model-based segmentation of the anatomical structure by applying the deformable model to the image data to produce a deformed model with corresponding first and second parts;
        locates an image feature in the image data that matches the geometric relation with the first part of the deformed model based on an intensity profile orthogonally to the first part of the deformed model;
        adjusts a fit of the second part of the deformed model based on a location of the image feature so as to better fit the second part of the deformed model to the second part of the anatomical structure; and
        displays the anatomic structure based on the deformed model.

2. The system of claim 1, wherein the processor locates the image feature by applying a template matching to the intensity profile.

3. The system of claim 1, wherein the image feature is one of the group of: an edge, a plateau in the edge, a local maximum and a local minimum.

4. The system of claim 1, wherein the processor performs an image enhancement prior to locating the image feature in the image data.

5. The system of claim 4, wherein the processor performs a directional filtering as part of the image enhancement, the directional filtering having a filter orientation parallel to the first part of the deformed model.

6. The system of claim 1, wherein the geometric relation is defined by at least one of the group of: a distance, a range of distances, a direction, and a range of directions, from the first part of the deformable model to the second part of the deformable model.

7. The system of claim 1, wherein the processor:
determines a probability of whether the image feature that has been located actually corresponds to the second part of the anatomical structure; and
adjusts the fit of the second part of the deformed model based on the probability.

8. The system of claim 1, wherein the definition data is further indicative of a property of the image feature, and wherein the processor locates the image feature in the image data further based on the property.

9. The system of claim 1, wherein the deformable model is arranged for segmenting at least a part of a human heart, wherein the first part of the deformable model is arranged for fitting an endocardial surface of the human heart and the second part of the deformable model is arranged for fitting an epicardial surface of the human heart.

10. A workstation or imaging apparatus comprising the system of claim 1.

11. A method for performing a model-based segmentation of an anatomical structure in a medical image, the method comprising:
obtaining image data of the medical image;
providing model data defining a deformable model for segmenting a type of anatomical structure, the deformable model comprising parts to be fitted to corresponding parts of the anatomical structure;
providing definition data defining a geometric relation between a first part and a second part of the deformable model;
performing a model-based segmentation of the anatomical structure by applying the deformable model to the image data to produce a deformed model with corresponding first and second parts;
locating an image feature in the image data that matches the geometric relation with the first part of the deformed model based on an intensity profile orthogonally to the first part of the deformed model;
adjusting a fit of the second part of the deformed model based on a location of the image feature so as to better fit the second part of the deformed model to the second part of the anatomical structure; and
displaying the anatomical structure based on the deformed model.

12. A non-transitory computer-readable medium comprising a program that, when executed by a processor, causes the processor to:
obtain image data of a medical image;
obtain model data that defines a deformable model for segmenting a type of anatomical structure, the deformable model comprising parts to be fitted to corresponding parts of the anatomical structure;
obtain definition data defining a geometric relation between a first part and a second part of the deformable model;
perform a model-based segmentation of the anatomical structure by applying the deformable model to the image data to produce corresponding first and second parts of a deformed model;
determine an intensity profile orthogonally to the first part of the deformed model
locate an image feature in the image data that matches the geometric relation with the first part of the deformed model by searching for the image feature in the intensity profile of the image data;
adjust a fit of the second part of the deformed model based on a location of the image feature so as to better fit the second part of the deformed model to the second part of the anatomical structure, and
display an image of the anatomical structure based on the deformed model.

13. The medium of claim 12, wherein the program causes the processor to locate the image feature by applying a template matching to the intensity profile.

14. The medium of claim 12, wherein the image feature is one of the group of: an edge, a plateau in the edge, a local maximum and a local minimum.

15. The medium of claim 12, wherein the program causes the processor to perform an image enhancement prior to locating the image feature in the image data.

16. The medium of claim 15, wherein the program causes the processor to perform a directional filtering as part of the image enhancement, the directional filtering having a filter orientation parallel to the first part of the deformed model.

17. The medium of claim 12, wherein the geometric relation is defined by at least one of the group of: a distance, a range of distances, a direction, and a range of directions, from the first part of the deformable model to the second part of the deformable model.

18. The medium of claim 12, wherein the program causes the processor to:
determine a probability of whether the image feature that has been located actually corresponds to the second part of the anatomical structure; and
adjust the fit of the second part of the deformed model based on the probability.

19. The medium of claim 12, wherein the definition data is further indicative of a property of the image feature, and wherein the program causes the processor to locate the image feature in the image data further based on the property.

20. The medium of claim 12, wherein the deformable model is arranged for segmenting at least a part of a human heart, wherein the first part of the deformable model is arranged for fitting an endocardial surface of the human heart and the second part of the deformable model is arranged for fitting an epicardial surface of the human heart.

* * * * *